US00RE46782E

(19) United States
(12) Reissued Patent
Paz et al.

(10) Patent Number: US RE46,782 E
(45) Date of Reissued Patent: Apr. 10, 2018

(54) CLOSED LOOP VOLTAGE CONTROL USING ADJUSTABLE DELAY LINES

(71) Applicant: Marvell International Ltd., Hamilton (BM)

(72) Inventors: Nir Paz, Azur (IL); Mark N. Fullerton, Austin, TX (US)

(73) Assignee: Marvell International Ltd., Hamilton (BM)

(21) Appl. No.: 14/480,075

(22) Filed: Sep. 8, 2014

Related U.S. Patent Documents

Reissue of:
(64) Patent No.: 8,046,601
Issued: Oct. 25, 2011
Appl. No.: 11/962,071
Filed: Dec. 20, 2007

U.S. Applications:
(62) Division of application No. 14/058,964, filed on Oct. 21, 2013, now abandoned, which is an application for the reissue of Pat. No. 8,046,601.

(60) Provisional application No. 60/871,283, filed on Dec. 21, 2006.

(51) Int. Cl.
*G06F 1/00* (2006.01)
*G06F 1/26* (2006.01)

(52) U.S. Cl.
CPC . *G06F 1/00* (2013.01); *G06F 1/26* (2013.01)

(58) Field of Classification Search
CPC ..... G06F 1/26; G06F 1/32; G06F 1/28
USPC ..... 713/300
See application file for complete search history.

(56) References Cited

U.S. PATENT DOCUMENTS

| | | | | |
|---|---|---|---|---|
| 5,459,402 | A | 10/1995 | Ueno et al. | |
| 6,622,255 | B1 | 9/2003 | Kurd et al. | |
| 6,868,503 | B1 | 3/2005 | Maksimovic et al. | |
| 6,876,186 | B1 | 4/2005 | Gupta | |
| 7,265,396 | B2 * | 9/2007 | Maeno et al. | 257/208 |
| 7,317,342 | B2 | 1/2008 | Saint-Laurent | |
| 7,363,520 | B1 * | 4/2008 | Maier et al. | 713/300 |

(Continued)

FOREIGN PATENT DOCUMENTS

WO WO 2005124516 A2 * 12/2005 ..... G06F 1/28

OTHER PUBLICATIONS

Pennanen, "Optimizing the Power for Multiple Voltage Domains," National Semiconductor Corporation, 2006.

(Continued)

*Primary Examiner* — Jalatee Worjloh

(57) ABSTRACT

Controlling a power supply which supplies a voltage to target circuit of an integrated circuit. An adjustable delay line powered by the supply voltage is co-located on the IC with the target circuit. The adjustable delay line is subjected to substantially the same operating conditions as the target circuit. A control unit measures a delay time of the adjustable delay line. Based on the measured delay time, the control unit outputs a control signal by which the power supply adjusts the supply voltage. The adjustable delay line comprises multiple distinct delay elements, each with delay properties and responsivity to changes in operating conditions. Each delay element emulates delay properties of physical elements (e.g., gates and wires) in the target circuit. In this manner, power consumption may be reduced, while still maintaining proper operation of the target circuit.

33 Claims, 11 Drawing Sheets

(56) References Cited

U.S. PATENT DOCUMENTS

| | | | | |
|---|---|---|---|---|
| 7,506,189 | B1 * | 3/2009 | Lee | G06F 1/3203 713/300 |
| 7,818,590 | B2 * | 10/2010 | Yang | G11C 5/14 713/300 |
| 7,849,348 | B1 | 12/2010 | Sidiropoulos et al. | |
| 7,886,167 | B2 * | 2/2011 | Burton | G06F 1/206 365/222 |
| 8,098,784 | B2 | 1/2012 | Campbell | |
| 2007/0109006 | A1 * | 5/2007 | Klass et al. | 324/765 |
| 2008/0046771 | A1 | 2/2008 | Hsu | |

OTHER PUBLICATIONS

Hartman et al., "On-Chip Power Management Utilizing an Embedded Hardware Controller and a Lower-Power Serial Interface," National Semiconductor Corporation, 2004.

"Intelligent Energy Manager (IEM) Hardware Control System in the ARMI176JZF-S Development Chip," Document No. ARM DAI 172A, ARM Limited, Aug. 21, 2006.

Dhar et al., "Closed-Loop Adaptive Voltage Scaling Controller for Standard-Cell ASICs," ISPLED, Aug. 12, 2002.

"Advanced Power Controller—APCI ," National Semiconductor Corporation, 2004.

Mortensen, "PowerWise Technology Power Supply and Adaptive Voltage Control," National Semiconductor Corporation, Oct. 2004.

Juha Pennanen, "Optimizing the Power for Multiple Voltage Domains", National Semiconductor Corporation, 2006.

David Scott, Sachin Idgunji, Dar-Sun Tsien and David Flynn, "RTL to GDSII Design Methodology for Dynamic Frequency and Voltage Scaling Enabled SoC-A Case Study", SNUG, 2005.

Sandeep Dhar, Dragan Maksimovic and Bruno Kranzen, "Closed-Loop Adaptive Voltage-Scaling Controller for Standard-Cell ASICs", ISPLED, Aug. 12, 2002.

National Semiconductor Corporation, "Advanced Power Controller—APCI", 2004.

* cited by examiner

CLOSED LOOP VOLTAGE CONTROL USING ADJUSTABLE DELAY LINES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue divisional application of U.S. application Ser. No. 14/058,964, filed on Oct. 21, 2013, which is a reissue application of U.S. Pat. No. 8,046,601, which issued on Oct. 25, 2011, and* claims the benefit of U.S. Provisional Patent Application No. 60/871,283, filed Dec. 21, 2006[, the contents of which are hereby incorporated by reference as if fully stated herein]. *The complete disclosures of the above applications are incorporated herein by reference in its entirety.*

FIELD

The present disclosure relates to power management in general, and, more specifically, to closed loop voltage control for integrated circuits.

BACKGROUND

Closed Loop Voltage Control (CLVC) is a power management technique that reduces the average dynamic power consumption of an integrated circuit (IC) by dynamically adjusting the supply voltage of a target circuit of the IC to a minimum level required for proper operation.

Typical CLVC systems make an indirect measurement of the target circuit's present performance and adjust the supply voltage, based on the measurement, to maintain a target performance level. The indirect measurement of the target circuit's present performance is provided by an emulation circuit, normally a programmable delay line, that is co-located on the IC with the target circuit. Instead of measuring delay times along a critical path of the target circuit, a measurement is made of the delay propererties of the emulation circuit. The delay line is powered by the same controlled voltage level that also powers the target IC, and the measured delay times are based on the delay properties of the delay line.

Based on a comparison between the measured delay times and a target delay time, an adjustment of the supply voltage is made. To minimize power consumption, the supply voltage is kept as low as possible while still meeting a given performance level.

SUMMARY

The delay lines might not always accurately emulate a critical path of the target circuit. The critical path may include distinct circuit elements that respond differently to process, voltage, and temperature (PVT) variations. For example, a temperature change will affect a delay through a gate differently than it would affect a delay through a wire. However, delay elements in typical emulation circuits all have similar delay properties, and thus all respond to PVT variations in the same manner. Therefore, delay lines in typical CLVC systems may not accurately match the delay properties of the critical path of the target circuit. Thus, the measured delay of the emulation circuit may be different than the actual delay of the critical path.

Embodiments of the present invention provide a closed-loop voltage controller and a method for controlling a supply voltage of a power supply which supplies a voltage to a target circuit of an IC. An adjustable delay line can be configured to emulate a critical path of the target circuit. Once configured, the delay line's configuration can remain fixed until it is re-configured to emulate a different critical path. The configured delay line can be used to estimate a delay time of the critical path. Based on this estimated delay time, the supply voltage can be adjusted to maintain a target performance level.

The adjustable delay line is powered by the supply voltage and is co-located on the IC with the target circuit. The adjustable delay line is subjected to substantially the same operating conditions as the target circuit. A control unit measures a delay time of the adjustable delay line. Based on the measured delay time, the control unit outputs a control signal instructing the power supply to adjust the supply voltage. The adjustable delay line comprises multiple distinct delay elements, each with delay properties and responsivity to changes in operating conditions. The delay elements emulate delay properties of physical elements (e.g., gates and wires) in the target circuit.

The delay properties of each delay element can be different. The delay elements can be connected in series and arranged in segments, each segment including delay elements having substantially the same delay properties, wherein the number of delay elements in each delay line segment is selectable. For example, delay elements in one segment may emulate the delay properties of one type of gate, and delay elements of other segments may emulate the delay properties of other gates or wires that form the target circuit.

By virtue of the delay elements with different delay properties, the adjustable delay line may be configured to more accurately emulate the delay properties of a critical path of the target circuit. As a result, a measured delay of the adjustable delay line may more accurately represent the actual delay of the critical path. With more accurate delay measurements, the supply voltage may be set to a lower value for a target performance level, thereby reducing power consumption, while still maintaining proper operation of the target circuit.

The delay segments can include a first segment of standard threshold voltage (SVT) gate delay elements, a second segment of high threshold voltage (HVT) gate delay elements, and a third segment of wire delay elements.

The adjustable delay line can be configured to emulate a critical path of the target circuit. The adjustable delay line can be configured such that a quantity of distinct delay elements used in the adjustable delay line is proportional to the corresponding quantity of distinct physical elements in the critical path. The critical path to emulate can be chosen based on a Dynamic Voltage Management (DVM) power management system.

The delay time can be measured based on a plurality of delay line measurements. The plurality of delay line measurements can be compared to a predetermined time. The delay time can be longer or shorter than the predetermined time. The delay time of the adjustable delay line can be adjusted for each measurement to indicate how much the delay time differs from the predetermined time, and the delay time is adjusted without changing proportions of distinct delay elements used in the adjustable delay line.

The supply voltage can be adjusted by lowering the supply voltage if the measured delay time through the adjustable delay line is shorter than a lowest time in a predetermined time range, and raising the supply voltage if the measured delay time is longer than a longest time in the predetermined time range. The supply voltage can be adjusted by sending a control signal to an Inter-Integrated Circuit ($I^2C$) interface slave of the power supply, which also functions to accept control signals from other sources, such as a control signal from a DVM based power manager.

This brief summary has been provided so that the nature of the invention may be understood quickly. A more complete understanding of the invention can be obtained by reference to the following detailed description of the embodiment thereof in connection with the attached drawings.

BRIEF DESCRIPTION OF THE DRAWINGS

The present invention will be more readily understood from a detailed description of example embodiments taken in conjunction with the following figures.

DETAILED DESCRIPTION

Figure 1:
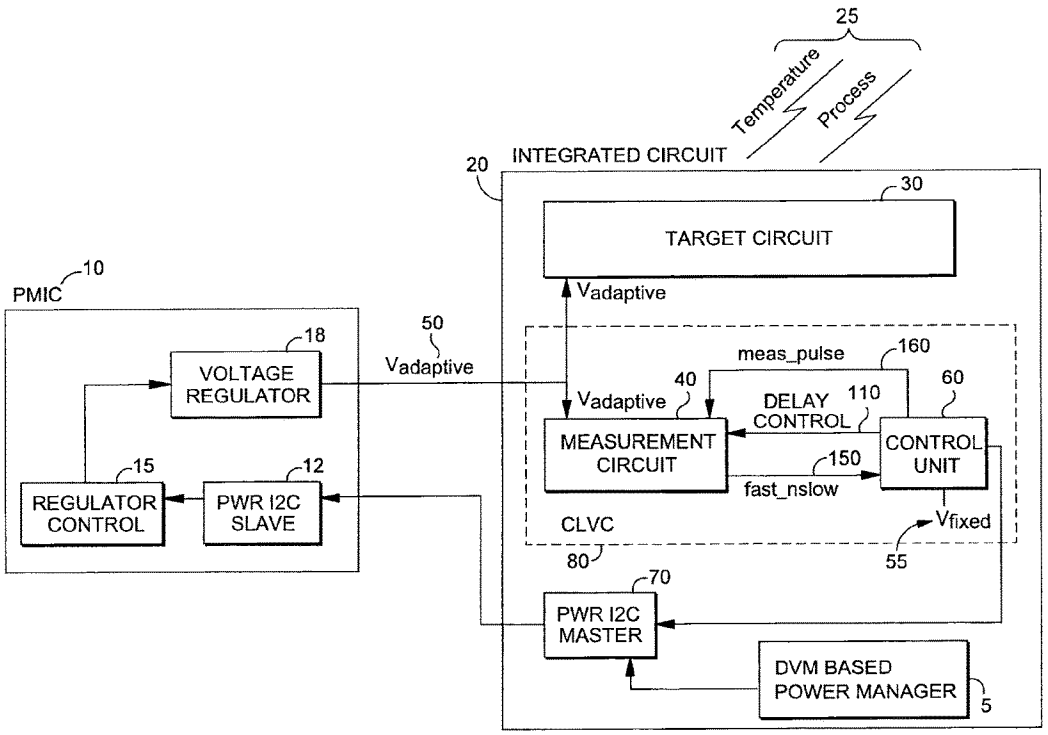
FIG. 1 is a block diagram of a closed loop voltage control (CLVC) system.

FIG. 1 is a block diagram of a closed loop voltage control system. Integrated circuit (IC) 20 includes target circuit 30, which receives a supply voltage 50 (Vadaptive) from power management integrated circuit (PMIC) 10. Closed-loop voltage controller (CLVC) 80, included in IC 20, adjusts supply voltage 50, based on the performance of target circuit 30.

IC 20 can be, for example, an application specific integrated circuit (ASIC), system-on-a-chip (SoC), or any other suitable IC. Target circuit 30 implements functionality of a device in which IC 20 is operating. For example, in the context of a hard disk drive, target circuit 30 is either or both a signal processing and/or control circuit. In the context of a DVD drive, target circuit 30 is either or both a signal processing and/or control circuit, and/or a mass data storage circuit. In the context of a high definition television, cellular phone, set-top box, media player, or Voice over Internet Protocol (VoIP) phone, target circuit 30 is either or both a signal processing and/or control circuit, a Wireless Local Area Network (WLAN) interface circuit and/or a mass data storage circuit. In the context of a vehicle control system, target circuit 30 is part of a powertrain control system, an anti-lock braking system (ABS), a navigation system, a telematics system, a vehicle telematics system, a lane departure system, an adaptive cruise control system, a vehicle entertainment system, or the like. Still other implementations are contemplated.

CLVC 80 includes measurement circuit 40 and control unit 60. Measurement circuit 40 includes a delay line (e.g., delay line 100 of FIGS. 2 and 3) that emulates the delay properties of a critical path of target circuit 30. Measurement circuit 40 and target circuit 30 are positioned on IC 20 such that they operate under substantially similar operating conditions 25, such as, for example, operating temperature and device process variability, or other process, voltage, and temperature (PVT) variations.

Figure 2:
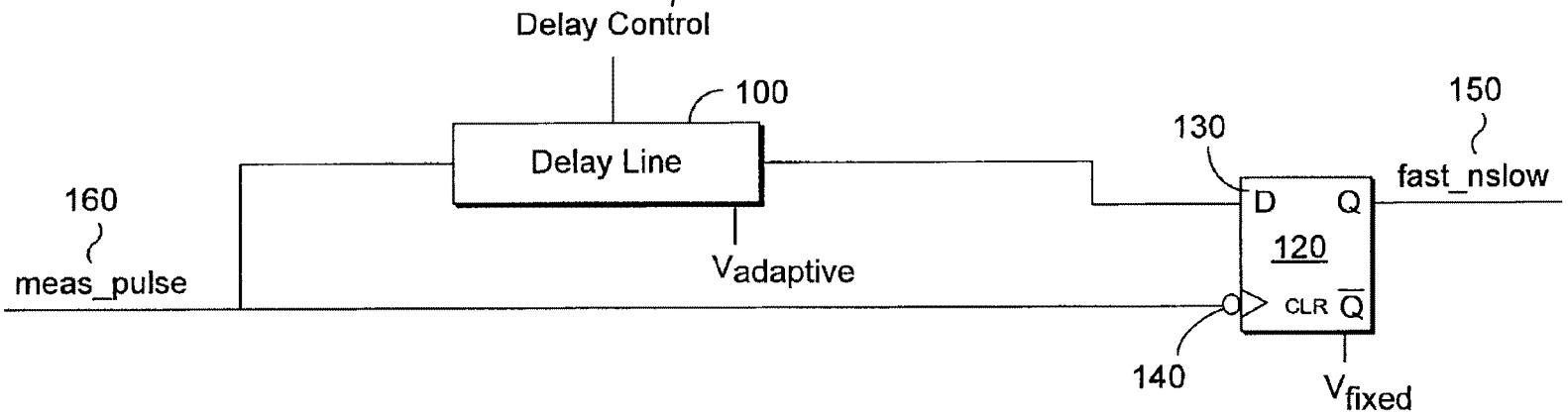
FIG. 2 is a block diagram of a measurement circuit.
Figure 3:
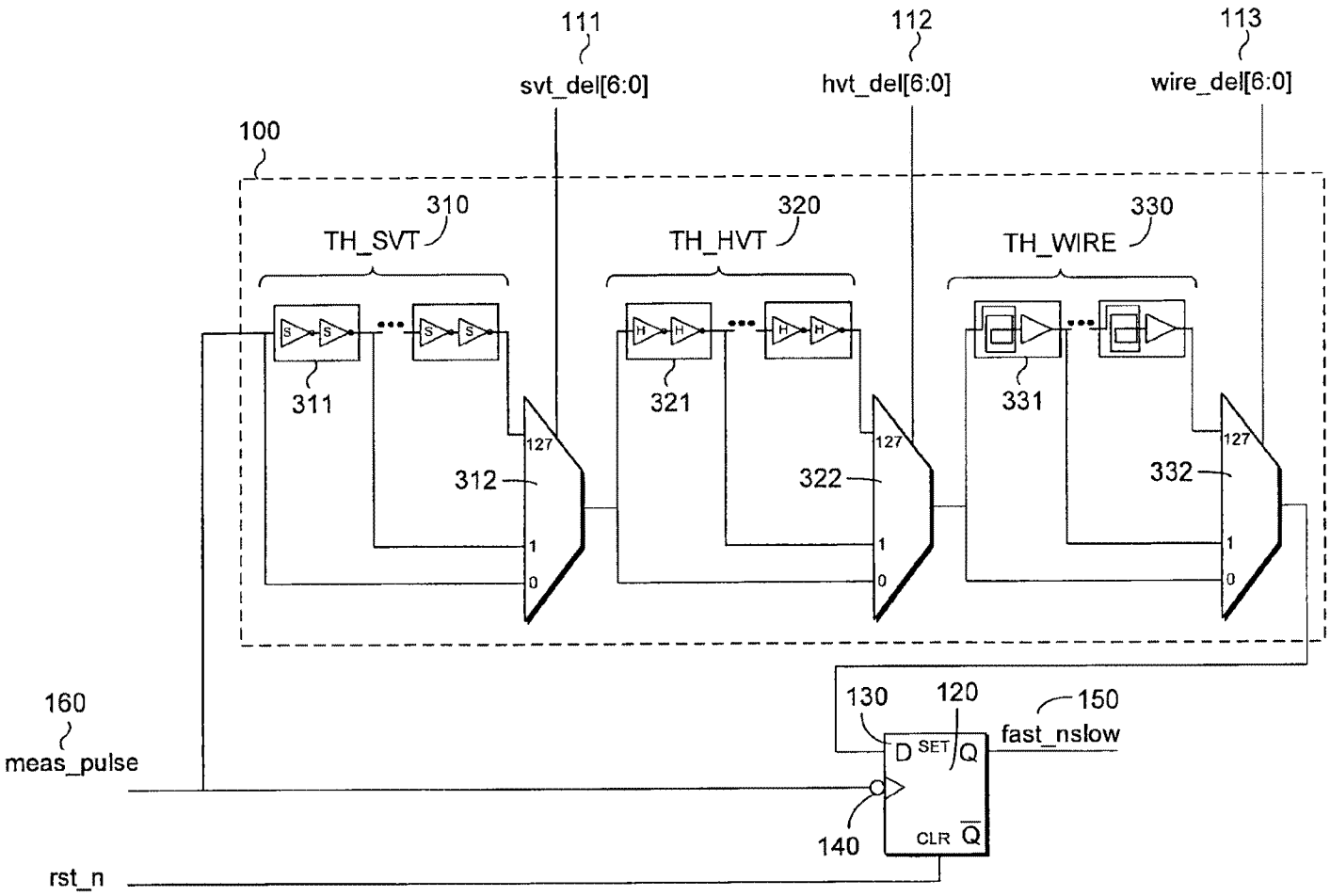
FIG. 3 is a more detailed block diagram of a measurement circuit, in accordance with an embodiment of the invention.

Measurement circuit 40 receives supply voltage 50 (Vadaptive) from PMIC 10, and a measuring pulse 160 (meas_pulse) and a delay control 110 from control unit 60. Delay control 110 is provided by control unit 60 to configure the delay properties of delay line 100 (FIGS. 2 and 3). Measurement circuit outputs a comparison signal 150 between a delay time of the delay line 100 and a duration of measuring pulse 160, based on the configuration specified by 110.

Control unit 60 adjusts supply voltage 50 based on output 150 (fast_nslow), provided by measurement circuit 40. Control unit 60 adjusts supply voltage 50 by sending a voltage change request to PMIC master control 70, which sends a voltage control signal to PMIC 10. Control unit 60 receives supply voltage 55 (Vfixed), which may be different from supply voltage 50 (Vadaptive). Although supply voltage 55 is a fixed voltage (Vfixed) in the embodiment illustrated in FIG. 1, in other embodiments, supply voltage 55 may be a variable voltage.

In the illustrated embodiment, PMIC 10 is separate from IC 20. PMIC 10 includes PMIC slave node 12, regulator control 15, and voltage regulator 18. PMIC slave node 12 receives voltage control signals from PMIC master control 70. PMIC master control 70 communicates with PMIC slave node 12 using, for example, an Inter-Integrated Circuit ($I^2C$) interface, or any other suitable type of interface. PWR master control 70 may also receive voltage change requests from Dynamic Voltage Management (DVM) (or Dynamic Voltage Frequency Scaling (DVFS)) based power manager 5, or any other voltage controller. DVM based power manager 5 sends voltage change requests to PWR master control 70 in response to the issuance of a voltage change request by, for example, DVM software.

PMIC slave node 12 forwards a received voltage control signal to regulator control 15, which decodes the received control signal and commands voltage regulator 18 to adjust the voltage in accordance with the decoded control signal.

FIG. 2 is a block diagram of measurement circuit 40 of FIG. 1. Measurement circuit 40 includes adjustable delay line 100 and flip-flop 120. Flip-flop 120 receives a supply voltage (Vfixed), which may be different from supply voltage 50 (Vadaptive) of FIG. 1. Although flip-flop 120 receives a fixed supply voltage (Vfixed) in the embodiment illustrated in FIG. 2, in other embodiments, flip-flop 120 may receive a variable voltage.

Delay line 100 receives supply voltage 50 (Vadaptive), delay control 110, and measuring pulse 160 (meas_pulse) (shown in FIG. 1). Measuring pulse 160 is a high pulse having a duration of a target delay time. Flip-Flop 120 is a D flip-flop receiving measuring pulse 160 at negated clock input 140, and the output of delay line 100 at D input 130. Q output 150 outputs the delay line measurement result fast_nslow, which is the value of input 130 at the moment of a falling edge of measuring pulse 160 (i.e., after a delay equal to the target delay time).

If output 150 is 0 (during the falling edge of measuring pulse 160), then measuring pulse 160 has not exited delay line 100, which indicates that delay line 100 has a delay time longer than the duration of measuring pulse 160 (i.e., the target delay time). If output 150 is 1 (during the falling edge of measuring pulse 160), then measuring pulse 160 is exiting delay line 100, which indicates that delay line 100 has a delay time shorter than the duration of measuring pulse 160 (i.e., the target delay time).

FIG. 3 is a block diagram of measurement circuit 40 of FIG. 1 showing delay line 100 in more detail. Delay line 100 includes distinct delay elements 311, 321, and 331 with different delay properties and responsivity to changes in operating conditions. Each distinct delay element 311, 321, and 331 is adapted to emulate delay properties of distinct physical elements of a critical path of target circuit 30. The delay elements 311, 321, and 331 are connected in series and arranged in segments 310, 320, and 330, respectively. Each segment includes a selectable number of delay elements having similar delay properties.

In the illustrated embodiment, segment 310 includes standard threshold voltage (SVT) gate delay elements, segment 320 includes high threshold voltage (HVT) gate delay elements, and segment 330 includes wire delay elements. In other embodiments, delay line 100 may include any number of segments including any suitable type of delay element. The number of delay elements used in each of segments 310, 320, and 330 is selected by multiplexers (MUX's) 312, 322, and 332, respectively.

For each segment, the input of the segment's first delay element and the outputs of all delay elements are tapped and connected to a MUX (312, 322, or 332). The input of the segment's first delay element is connected with the 0-th input of the MUX (312, 322, or 332), and the output of the n-th delay element is connected with the n-th input of the MUX (312, 322, or 332). Selecting the n-th input of a delay line segment's MUX (312, 322, or 332) corresponds to choosing "n" delay elements (311, 321, or 331) used in that delay line segment (310, 320, or 330).

As illustrated in FIG. 3, delay control 110 of FIG. 2 is represented as three 7 bit values, svt_del 111, hvt_del 112, and wire_del 113 that specify the number of delay elements used in each of segments 310, 320, and 330, respectively. Svt_del 111 is the selection input for MUX 312, hvt_del 112 is the selection input for MUX 322, and wire_del 113 is the selection input for MUX 332. The values for svt_del 111, hvt_del 112, and wire_del 113 determine the number of delay elements used in each delay line segment by selecting the MUX input corresponding to the specified number of delay elements. For example, if svt_del=127, then all 127 SVT elements 311 will be used in segment 310.

In the illustrated embodiment, delay elements 311 and 321 include pairs of SVT and HVT inverter cells, respectively, connected in series, but in other embodiments, delay elements 311 and 321 may be any suitable type of delay elements. In the illustrated embodiment, delay elements 331 include a length of wire wrapped in a loop, but in other embodiments, delay elements 331 may be any suitable type of delay element representing a wire delay.

Delay line segments 310, 320, and 330 are connected in series. The input of delay line 100 is received by the input of the first delay element 311 and the 0-th input of MUX 312 of the first segment 310. The output of MUX 312 is received by the input of the first delay element 321 and the 0-th input of MUX 322 of segment 320. The output of MUX 322 is received by the input of the first delay element 331 and the 0-th input of MUX 332 of segment 330. The output of MUX 332 is the output of delay line 100.

Figure 4:
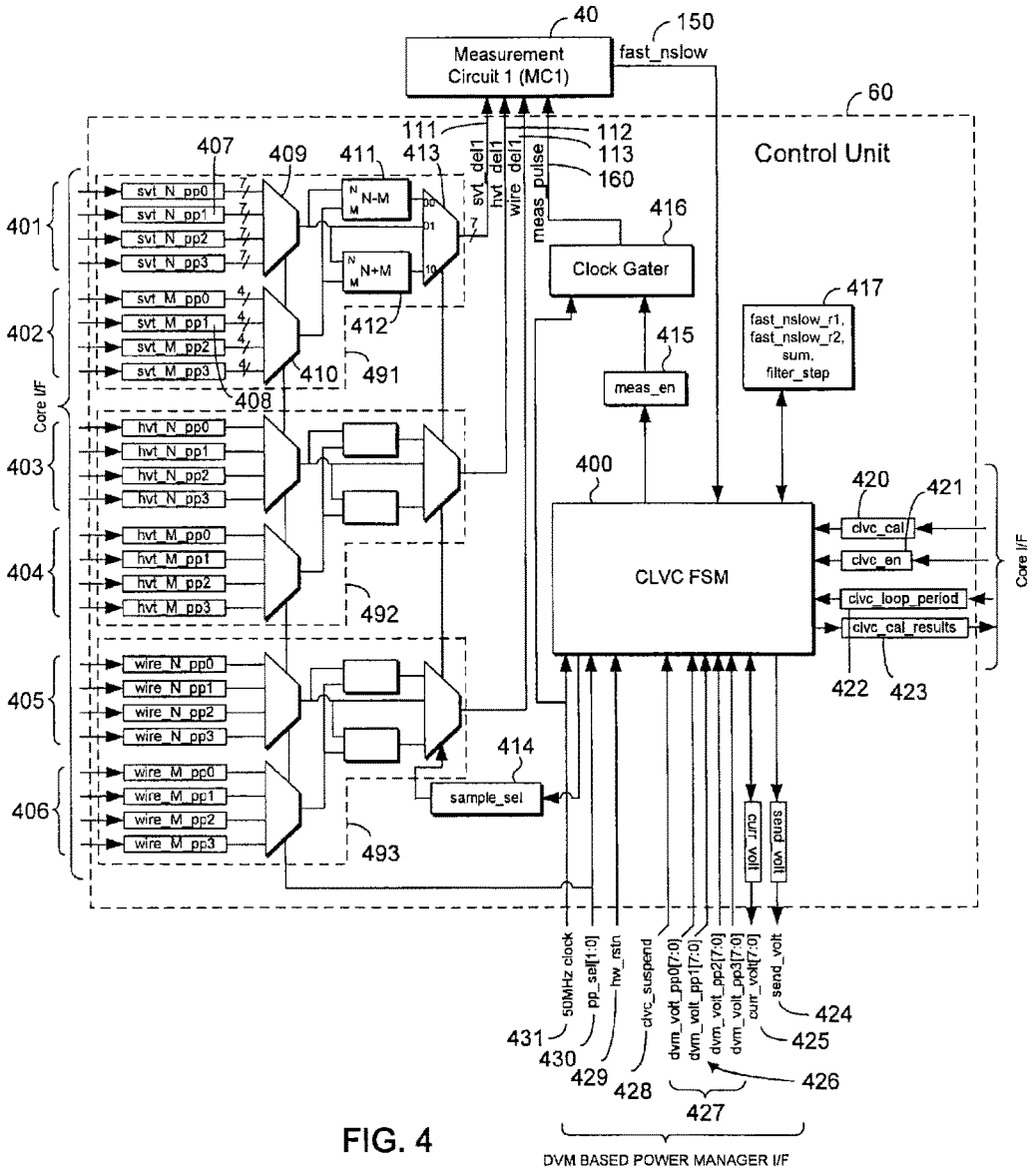
FIG. 4 is a block diagram of a control unit, in accordance with an embodiment of the invention.

FIG. 4 is a block diagram of control unit 60 of FIG. 2. Control unit 60 includes CLVC functional state machine (FSM) 400 and delay control generators 491, 492, and 493. CLVC FSM 400 includes logic for measuring a delay time using measurement circuit 40 and adjusting supply voltage 50, as will be described in more detail for FIG. 5. CLVC FSM 400 can be a hardware and/or a software module. CLVC FSM 400 receives inputs 427 to 431 and provides outputs 424 and 425 to a DVM based power manager (e.g., DVM based power manager 5). CLVC FSM 400 reads values stored in registers 417, 420, 421, and 422, and writes to registers 414, 415, 417, 423, and registers storing outputs 424 and 425. CLVC FSM receives output 150 from measurement circuit 40.

Delay control generators 491, 492, and 493 generate the svt_del 111, hvt_del 112, and wire_del 113 components of delay control 110, respectively. In the illustrated embodiment, each delay control generator includes two groups of registers. Each group has four registers, but in other embodiments, each group may have any number of registers.

Registers in group N (401, 403, and 405) store absolute values for svt_del 111, hvt_del 112, and wire_del 113, respectively, that indicate the number of delay elements to use in delay line segments 310, 320, and 330, respectively, of FIG. 3. Registers in group M (402, 404, and 406) store offset values for svt_del 111, hvt_del 112, and wire_del 113, respectively, that are used to adjust the number of delay elements used in delay line segments 310, 320, and 330, respectively, during the measuring process described for FIG. 5.

Registers 401 to 406 of delay control generators 491 to 493 receive their values from a configuration interface (Core I/F). These values are determined during calibration of control unit 60. For each delay control generator, the values of registers in group N (e.g., 401) are received by inputs of a first MUX (e.g., 409), and the values of registers in group M (e.g., 402) are received by inputs of a second MUX (e.g., 410).

The n-th inputs of the multiplexers of the N and M groups (e.g., 409 and 410) for each delay control generator (e.g., 491 to 493) specify the n-th configuration for delay line 100 of measurement circuit 40. For example, the values stored in registers svt_N_pp1, svt_M_pp1, hvt_N_pp1, hvt_M_pp1, wire_N_pp1, and wire_M_pp1 specify a second delay line configuration (corresponding to the second input of the N and M multiplexers). The selection inputs for the multiplexers of the N and M groups (e.g., 409 and 410) receive selection signal 430 (pp_sel) from, for example, DVM based power manager 5, which selects one of these delay line configurations.

DVM based power manager 5 selects a delay line configuration based on the context in which target circuit 30 is used. For example, DVM based power manager 5 may select one delay line configuration if target circuit 30 is used in a hard disk drive, and DVM based power manager 5 may select a different delay line configuration if target circuit 30 is used in a VoIP phone. After selecting the delay line configuration, DVM based power manager 5 does not typically change the delay line configuration. DVM based power manager 5 only changes the delay line configuration if a new path is more critical than the path of target circuit 30 that is emulated by the delay line's initial configuration, or if a different operating frequency is perceived as more critical than the current operating frequency at a particular voltage point.

The value of signal 430 is chosen to select a configuration of delay line 100 (of measurement circuit 40) that corresponds to the critical path (of target circuit 30) to emulate. For each configuration, the number of delay elements used in delay line segments 310, 320, and 330 is proportional to the corresponding number of distinct physical elements in the emulated critical path. For example, if forty percent of the elements in the critical path are SVT gates, forty percent of the elements are HVT gates, and twenty percent of the elements are wire delays, then for the corresponding delay line configuration, forty percent of the selected delay elements are SVT gate delay elements (311), forty percent are HVT gate delay elements (321), and twenty percent are wire delay elements (331).

The critical path to emulate may be determined by, for example, a DVM system (e.g., DVM based power manager 5 of FIG. 1), or any other suitable procedure or mechanism for selecting a critical path to emulate.

The output of the MUX for the N group is received at an input N of a subtracting module (e.g., 411), input N of an adding module (e.g., 412), and input 01 of an output MUX (e.g., 413). The output of the MUX for the M group is received at input M of the subtracting module (e.g., 411), and input M of the adding module (e.g., 412). The subtracting module (e.g., 411) outputs the difference between input N and input M, and the adding module (e.g., 412) outputs the sum of input N and input M. The output of the subtracting module (e.g., 411) is received at input 00 of the output MUX (e.g., 413), and the output of the adding module (e.g., 412) is received at input 10 of the output MUX (e.g., 413). The selection input for the output MUX (e.g., 413) receives a selection signal (generated by CLVC FSM 400) stored in register 414. The value stored in register 414 is set by CLVC FSM 400 to adjust the delay time of delay line 100 during the measuring process, which is described in more detail for FIG. 5.

The output of each output MUX (e.g., 413) is a generated component (e.g., 111, 112, 113) of delay control 110 provided to measurement circuit 40. In the illustrated embodiment, the output MUX output for each delay control generator outputs one of three results indicating three possible delay times for a given delay line configuration. The three possible results are the value of the selected register in the N group (N), the sum of the values of selected registers in the N and M groups (N+M), and the difference between the values of selected registers in the N and M groups (N−M).

For example, if signal 430 specifies the second configuration (i.e., "pp1", which includes values in registers 407 and 408), MUX 413 can output either svt_N_pp1 (i.e. N), svt_N_pp1+svt_M_pp1 (i.e., N+M), or svt_N_pp1−svt_M_pp1 (i.e., N−M), depending on the value stored in register 414. Each of these values specifies a different delay time of delay line 100, for the delay line configuration selected by signal 430. More specifically, each of these values specifies a different number of delay elements used in delay line segments 310, 320, and 330, without changing the proportions of delay elements 311, 321, and 331 used in delay line 100.

During calibration of control unit 60, the configuration interface (Core I/F) provides register groups 401 to 406 with values corresponding to various critical paths of target circuit 30 that may be emulated. For example, in the illustrated embodiment, the registers having the suffix "pp0", "pp1", "pp2", and "pp3" have values corresponding to a first, second, third, and forth critical path, respectively.

Prior to measuring delay times, the DVM based power manager provides selection signal 430 to control unit 60 for configuring delay line 100 (of measurement circuit 40) to emulate a critical path of target circuit 30. Based on the value of signal 430, each delay control generator 491, 492, and 493 selects a pair of register values from its corresponding N and M register groups. For example, if signal 430 specifies the second configuration (i.e., "pp1"), delay control generator 491 selects svt_N_pp1 and svt_M_pp1.

Delay control generators 491, 492, and 493 use the values stored in the selected pairs of registers to generate three delay control 110 values (i.e., N, N+M, and N−M) corresponding to the emulated critical path. Based on the value stored in register 414, one of these delay control 110 values is provided to measurement circuit 40. The selected delay control 110 value is provided as three separate components, 111, 112, and 113, provided by delay control generators 491, 492, and 493, respectively. Based on the received delay control 110 value, the number of delay elements in delay line 100 is configured. While measuring delay times, CLVC FSM 400 can change the value stored in register 414 to adjust the delay time of delay line 100. Changing the value stored in register 414 changes the number of delay elements used in delay line 100 without changing the proportions of delay elements 311, 321, and 331 used in delay line 100, as described above.

Once measurement circuit 40 has been configured, the control unit 60 may use it determine the delay time of delay line 100. A clock signal 431 is input to the CLVC FSM 400 and a clock gater 416. When the CLVC FSM 400 uses the measurement circuit 40 to perform a measurement, it indicates to the clock gater 416 that measurement is enabled (meas_en 415) so that the clock gater will send out a measuring pulse (meas_pulse 160) of a predetermined duration. The pulse will travel through the measurement circuit 40, and the measurement circuit 40 will output fast_nslow 150, indicating whether the delay time of its delay line 100 is longer or shorter than the duration of meas_pulse 160. The fast_nslow 150 result will be sent to the CLVC FSM 400, which temporarily stores the result in register 417.

The control unit 60 may use the measurement circuit 40 multiple times to obtain more accurate measurement results of an emulated critical path. For a given emulated critical path (chosen by pp_sel 430), CLVC FSM 400 may measure the delay time using a low (N−M), medium (N), and high (N+M) threshold (delay time) for delay line 100's configuration (chosen by sample_sel 414). The CLVC FSM 400 may also repeat the same set of measurements multiple times to mitigate the effects of noise. The results of these measurements may be stored in the registers 417.

Based on the measurements, the CLVC FSM 400 may decide to raise the current voltage if the delay through the adjustable delay line is longer than an acceptable range, lower the current voltage if the delay is shorter than the acceptable range, or maintain the current voltage if the delay is within the acceptable range. The CLVC FSM 400 can send a raise-voltage or lower-voltage request (curr_volt 425) to the PMIC master control 70, which sends a voltage control signal to PMIC 10.

The CLVC FSM 400 receives a number of command and configuration inputs. Clvc_cal 421 enables calibration mode. Clvc_en 421 and clvc_suspend 428, enable and suspend operation of CLU FSM 400, respectively. The duration between voltage adjustments is specified by clvc_loop_period 422. Hw_rstn 429 resets CLVC FSM 400.

In the illustrated embodiment, inputs 427 include reference voltages used to generate voltage change requests. Each voltage specified in 427 corresponds to one of the four delay line configurations "pp0", "pp1", "pp2", and "pp3" provided by registers in groups 401 to 406. Voltage levels specified by 427 can be determined by, for example, a DVM system (e.g., DVM based power manager 5), or any other suitable voltage control system.

After CLV FSM 400 is enabled, CLV FSM generates the first voltage change request by incrementing or decrementing the reference voltage specified in 427 by one voltage change unit, and providing this value as the requested voltage level for supply voltage 50. For example, for delay line configuration "pp1", the reference voltage is dvm_volt_pp1. After CLV FSM 400 is enabled, if the first voltage change request is a voltage increase, the requested voltage is dvm_volt_pp1+1.

Figure 5:
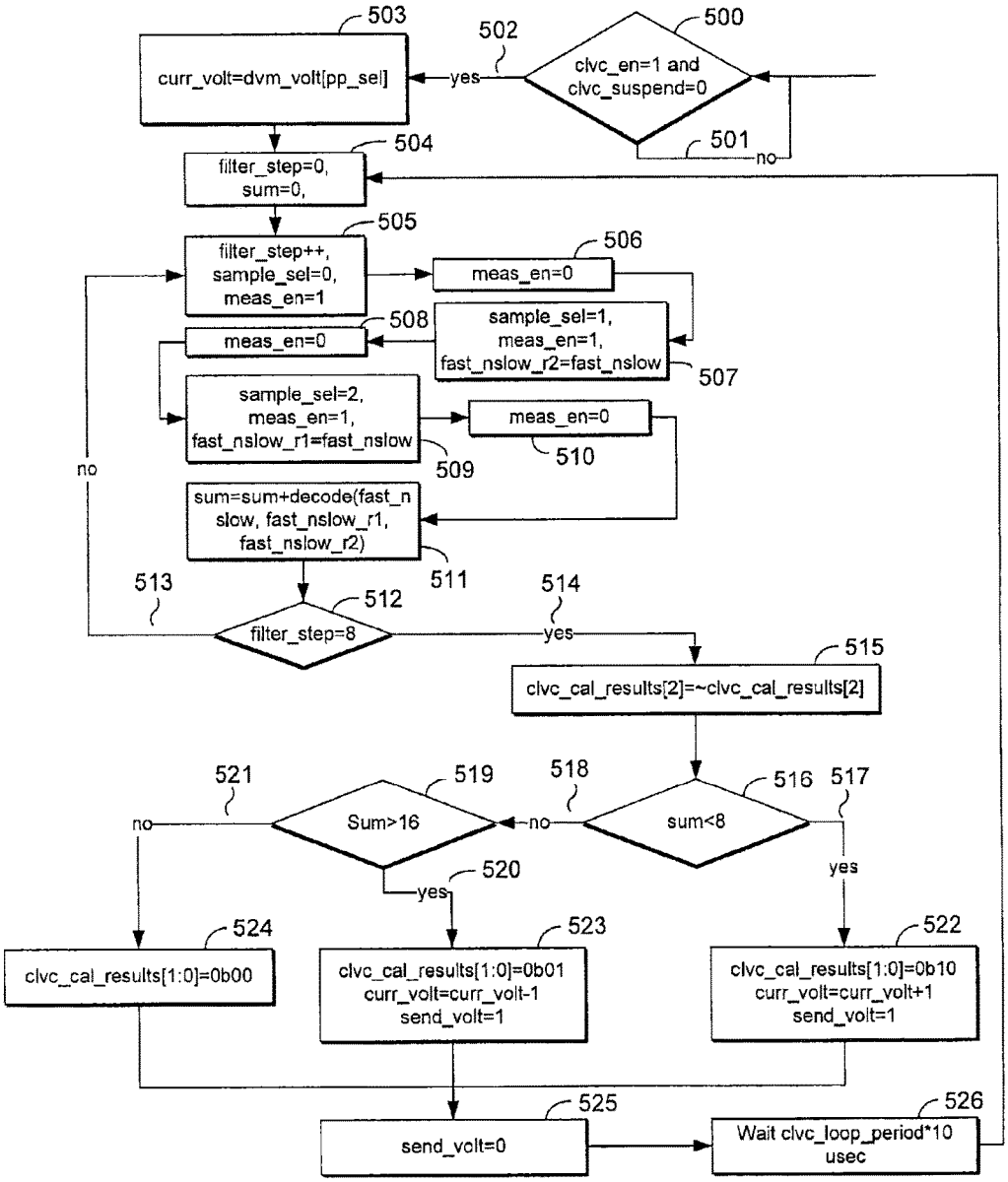
FIG. 5 is a flowchart depicting a process for adjusting a supply voltage, in accordance with an embodiment of the invention.

FIG. 5 is a flowchart depicting a process performed by CLVC FSM 400 of FIG. 4 for adjusting supply voltage 50 of FIG. 1. At block 500 CLVC FSM 400 checks whether CLVC is enabled (clvc_en=1), and whether CLVC is not in suspend mode (clvc_suspend=0). If either of these conditions is not satisfied (501), CLVC FSM will continue to check these conditions until they are satisfied, before proceeding to block 502. If enabled and not in suspend mode (502), then CLVC FSM will proceed to block 503.

At block 503, CLVC FSM 400 stores the reference voltage for generating the first voltage change request in register cur_volt of FIG. 4 (cur_volt=dvm_volt[pp_sel]). This reference voltage (dvm_volt[pp_sel]) is the reference voltage specified by the input of 427 corresponding to the current delay line configuration. The current delay line configuration is specified by pp_sel (input 430 of FIG. 4). For example, if pp_sel equals "pp1", CLVC FSM 400 sets register cur_volt to dvm_volt_pp1 (427 of FIG. 4), which is the reference voltage corresponding to delay line configuration "pp1".

At block 504, CLVC FSM resets the counter indicating the number of measurements performed for a single voltage adjustment iteration (filter_step=0). This counter is stored in register 417 of FIG. 4. CLVC FSM also resets the current sum of decoded measurement results (sum=0). This value is also stored in register 417 of FIG. 4.

At block 505, the counter indicating the number of performed measurements is incremented (filter_step++), a first delay time (threshold) of the configured delay line 100 is selected (sample_sel=0), and measurement pulse 160 is sent through delay line 100 (meas_en=1). In the present embodiment, the first delay time is the lowest delay time, resulting from the delay line configuration based on the outputs of the subtracting modules (e.g., 411) of delay control generators 491, 492, and 493 of FIG. 4.

At block 506, the pulse generator (e.g., clock gater 416 of FIG. 4) is disabled so that no additional measurement pulse will be sent (meas_en=0). At block 507 CLVC FSM 400 receives the first measurement result (fast_nslow 150) from measurement circuit 40 and saves this result in register 417 (fast_nslow_r2=fast_nslow). The delay time of delay line 100 is increased (sample_sel=1) by selecting the delay line configuration based on the outputs of the multiplexers for the N groups (e.g., 409 of FIG. 4) of delay control generators 491, 492, and 493 of FIG. 4. Another measurement pulse 160 is sent through delay line 100 (meas_en=1).

At block 508, the pulse generator is disabled so that no additional measurement pulse will be sent (meas_en=0). At block 509 CLVC FSM 400 receives the second measurement result (fast_nslow 150) from measurement circuit 40 and saves this result in register 417 (fast_nslow_r1=fast_nslow). The delay time of delay line 100 is increased (sample_sel=2) by selecting the delay line configuration based on outputs of the adding modules, e.g., 412, of delay control generators 491, 492, and 493 of FIG. 4. Another measurement pulse 160 is sent through delay line 100 (meas_en=1).

At block 510, the pulse generator is disabled so that no additional measurement pulse will be sent (meas_en=0). At block 511 CLVC FSM 400 receives the third measurement result (fast_nslow 150) from measurement circuit 40. CLVC FSM 400 then generates a decoded measurement result based on the three measurement results, and adds this value to the current sum of decoded measurements results (sum=sum+decode(fast_nslow, fast_nslow_r1, fast_nslow_r2)). Decoded measurement results are generated according to Table 1.

TABLE 1

Generating decoded measurement results

| fast_nslow (high threshold) | fast_nslow_r1 (medium threshold) | fast_nslow_r2 (low threshold) | Decoded value |
|---|---|---|---|
| 0 | 0 | 0 | 0 |
| 0 | 0 | 1 | 1 |
| 0 | 1 | 0 | 2; error condition |
| 0 | 1 | 1 | 2 |
| 1 | 0 | 0 | 2; error condition |
| 1 | 0 | 1 | 2; error condition |
| 1 | 1 | 0 | 2; error condition |
| 1 | 1 | 1 | 3 |

A higher decoded value indicates a shorter measured delay for delay line 100. As Table 1 indicates, error conditions occur when a measurement for a higher threshold configuration (i.e., a configuration of delay line 100 using a greater number of delay elements) results in 1 while a measurement for a lower threshold configuration results in 0. A result of 1 means that the delay line 100's delay time is shorter than a predetermined time. Since the delay time should be even shorter when the threshold is lower, measurements indicating a shorter delay using a longer delay line are likely caused by an error. However, an error condition does not disqualify the measurement result and even decoded values indicating an error are added to the current sum of decoded measurements.

At block 512, CLVC FSM 400 checks if eight sets of measurements have been performed (filter_step−8). If less than eight sets of measurements have been performed (513), then CLVC FSM 400 repeats another set of measurements starting at block 505. If eight sets of measurements have been performed (514), then CLVC FSM 400 stops taking measurements and proceeds to block 515.

At block 515, register 423 (FIG. 4), which stores the CLVC results from the previous voltage adjustment iteration, is reset (clvc_cal_results[2]=~clvc_cal_results[2]). At block 516, CLVC FSM 400 determines whether the current sum of decoded measurements is less than eight. If the current sum of decoded measurements is not less than eight (517), processing proceeds to block 522 where a voltage change request for increasing the supply voltage 50 by one voltage unit is generated (curr_volt=curr_volt+1) and sent (send_volt=1) to PMIC 10 (FIG. 1), which processes this request. A value indicating the decision to increase supply voltage 50 is stored in register 423 (clvc_cal_results [1:0]=ob10). Thereafter, processing proceeds to block 525.

If the current sum of decoded measurements is less than eight (518), CLVC FSM 400 determines whether the current sum of decoded measurements is greater than sixteen, at block 519. If the current sum of decoded measurements is greater than sixteen (520), processing proceeds to block 523 where a voltage change request for decreasing the supply voltage 50 by one voltage unit is generated (curr_volt=curr_volt−1) and sent (send_volt=1) to PMIC 10 (FIG. 1), which processes this request. A value indicating the decision to increase supply voltage 50 is stored in register 423 (clvc_cal_results[1:0]=ob01). Thereafter, processing proceeds to block 525.

If the current sum of decoded measurements is not greater than sixteen (521), supply voltage 50 is not changed. At block 524, a value indicating the decision not to change supply voltage 50 is stored in register 423 (clvc_cal_results [1:0]=ob00). Thereafter, processing proceeds to block 525.

At block 525, CLVC FSM 400 has completed sending any voltage change request (send_volt=0), and at block 526, CLVC FSM 400 enters an idle state for a predetermined time specified by the value stored in register 422 of FIG. 4 (clvc_loop_period). After this predetermined time, processing proceeds to block 504 and another voltage adjustment iteration begins.

Figure 6A:
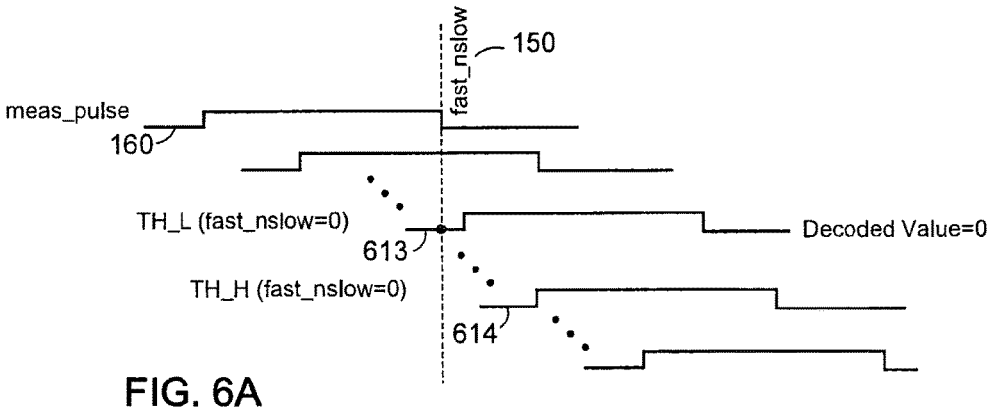
FIGS. 6A, 6B, and 6C are digital signal diagrams illustrating how delay times are measured, in accordance with an embodiment of the invention.
Figure 6B:
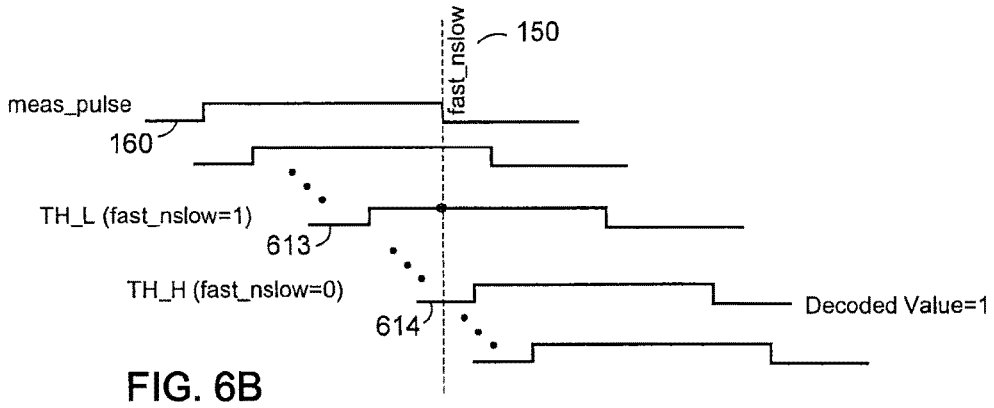
Figure 6C:
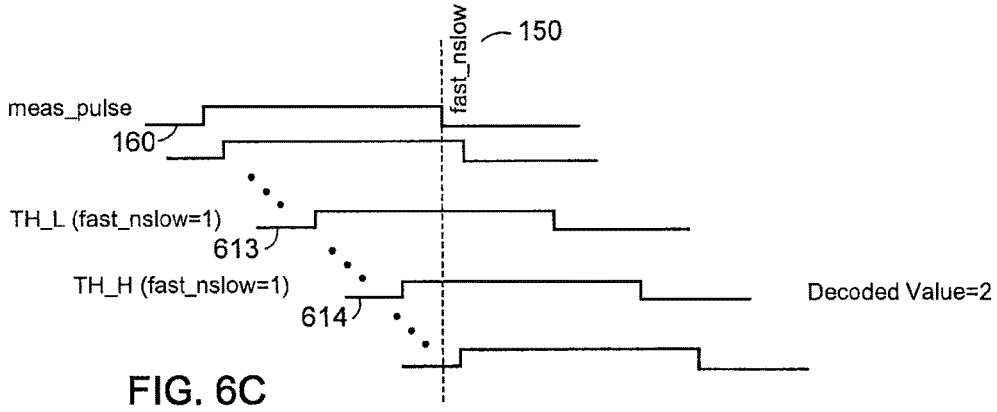

FIGS. 6A, 6B, and 6C are digital signal diagrams illustrating how decoded measurement results represent delay times. In these diagrams, only two measurements are illustrated, TH_L, and TH_H, which correspond to measurement results fast_nslow_r2 (block 507) and fast_nslow_r1 (block 509) of FIG. 5. The time difference between the rising edge of meas_pulse 160 and the rising edge of delay line 100's output signal (e.g., 613 or 614) is the delay time of delay line 100. The value of fast_nslow 150 is the value of delay line 100's output signal at the falling edge of meas_pulse 160. If the rising edge of delay line 100's output signal occurs after the falling edge of meas_pulse 160, then fast_nslow=0. This result indicates that the delay time of delay line 100 is greater than the duration of meas_pulse 160. If the rising edge of delay line 100's output signal occurs before the falling edge of meas_pulse 160, then fast_nslow=1. This result indicates that the delay time of delay line 100 is shorter than the duration of meas_pulse 160.

Multiple measurement results are decoded to provide a numerical value indicating a relative length of a measured delay time. A decoded measurement result having a higher numerical value indicates a shorter delay time. As illustrated in FIGS. 6A, 6B, and 6C, the results of two measurements are combined to provide a decoded measurement result, yielding three possible valid decoded measurement values, 0, 1, and 2 (a fourth value corresponds to an error condition). In other embodiments, additional measurements can be used to yield additional measurement values. The first measurement is performed while delay line 100 is configured with a lower threshold (i.e., a lower number of delay elements is used), and the second measurement is performed while delay line 100 is configured with a higher threshold (i.e., a greater number of delay elements is used). Signal 613 is the output signal of delay line 100 when configured with a lower threshold (TH_L), and signal 614 is the output signal of delay line 100 when configured with a higher threshold (TH_H).

FIG. 6A, illustrates decoded measurement result 0. As illustrated, fast_nslow=0 for both the lower and higher threshold configurations, TH_L, and TH_H, respectively. FIG. 6B, illustrates decoded measurement result 1. As illustrated, fast_nslow=1 for the lower threshold configuration (TH_L), and fast_nslow=0 for the higher threshold configuration (TH_H). FIG. 6C, illustrates decoded measurement result 2. As illustrated, fast_nslow=1 for the lower threshold configuration (TH_L), and fast_nslow=1 for the higher threshold configuration (TH_H).

Figure 7:
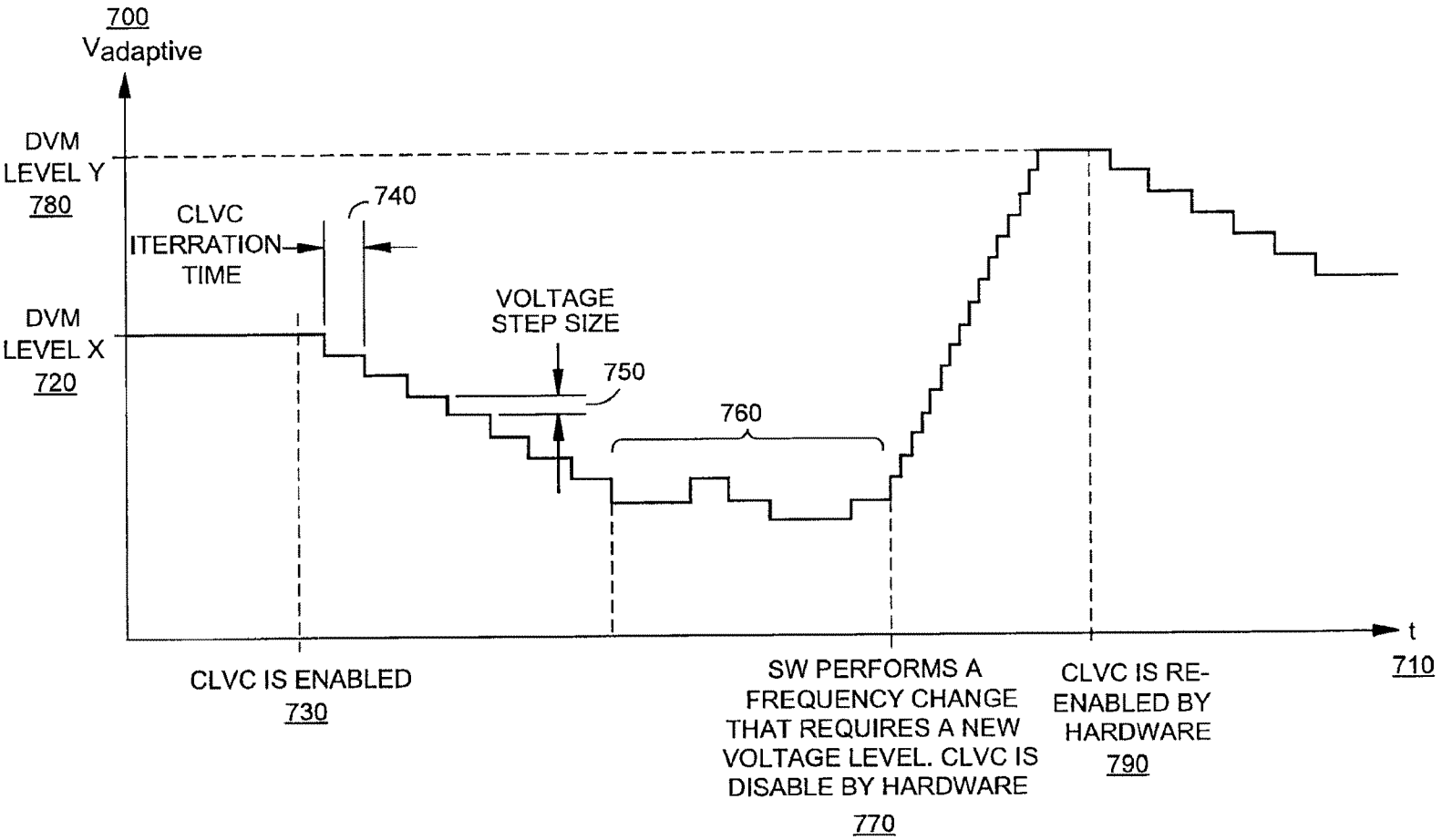
FIG. 7 is a graph that illustrates how the CLVC system affects the supply voltage, in accordance with an embodiment of the invention.

FIG. 7 is graph that illustrates how CLVC 80 (FIG. 1) affects supply voltage 50. The vertical axis 700 is the value of supply voltage 50 (Vadaptive), and the horizontal axis 710 is time. An initial value 720 for Vadaptive is set by, for example, a DVM system (e.g., DVM based power manager 5). At time 730, CLVC 80 is enabled, and Vadaptive begins to lower until Vadaptive reaches an optimal voltage for current operating conditions. Since in this embodiment CLVC changes voltage in steps, the lowering of Vadaptive forms the shape of descending steps. The width of each step 740 is the time between voltage adjustment iterations, and the height of each step 750 is the voltage step size. During period 760, CLVC 80 adjusts Vadaptive to compensate for variations in operating conditions.

At time 770, CLVC 80 is disabled and Vadaptive is changed by another power management system, such as, for example, a DVM system (e.g., DVM based power manager 5). The other power management system may change Vadaptive in response to, for example, a change in operating frequency of target circuit 30. At time 790, Vadaptive is set to the new value 780 and CLVC 80 is re-enabled. Once re-enabled, CLVC 80 adjusts this new value 780 until an optimal voltage for the new operating conditions is reached. In the illustrated embodiment, CLVC 80 is disabled and enabled by hardware, but in other embodiments, CLVC 80 may be disabled and enabled by software and/or hardware.

Figure 8A:
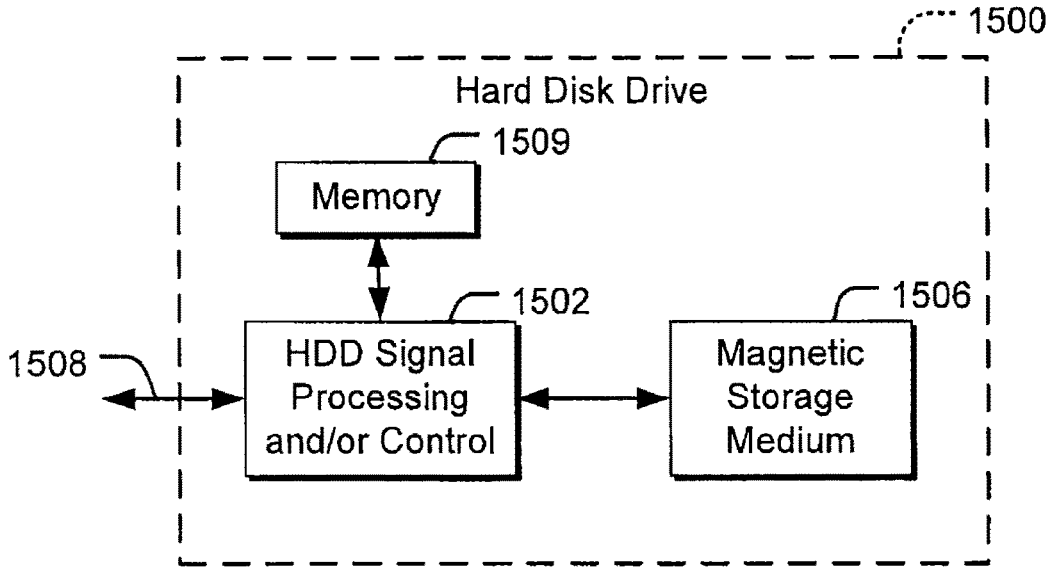
FIG. 8A is a block diagram of an embodiment of the invention in a hard disk drive.

Referring now to FIGS. 8A-8H, various exemplary implementations of the present invention are shown. Referring to FIG. 8A, the present invention may be embodied as a closed-loop voltage controller in a hard disk drive 1500. The embodiment of the present invention may implement either or both signal processing and/or control circuits, which are generally identified in FIG. 8A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 8B:
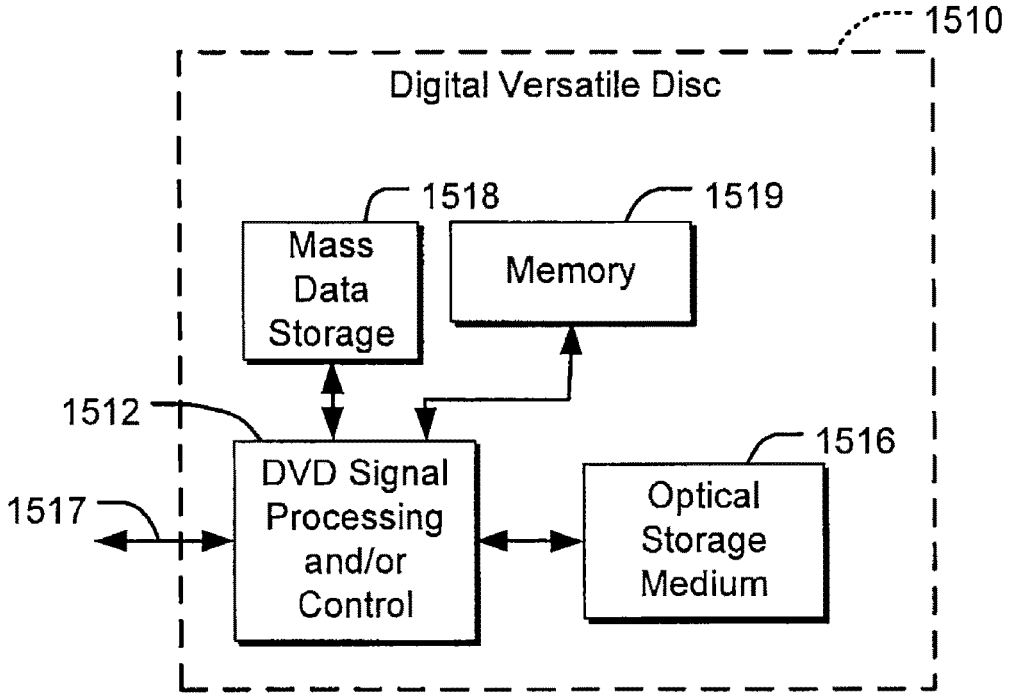
FIG. 8B is a block diagram of an embodiment of the invention in a DVD drive.

Referring now to FIG. 8B, the present invention may be embodied as a closed-loop voltage controller in a digital versatile disc (DVD) drive 1510. The embodiment of the present invention may implement either or both signal processing and/or control circuits, which are generally identified in FIG. 8B at 1512, and/or mass data storage 1518 of DVD drive 1510. Signal processing and/or control circuit 1512 and/or other circuits (not shown) in DVD 1510 may process data, perform coding and/or encryption, perform calculations, and/or format data that is read from and/or data written to an optical storage medium 1516. In some implementations, signal processing and/or control circuit 1512 and/or other circuits (not shown) in DVD 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD 1510 may communicate with mass data storage 1518 that stores data in a nonvolatile manner. Mass data storage 1518 may include a hard disk drive (HDD) such as that shown in FIG. 8A. The HDD may be a mini HDD that includes one or more platters having a diameter that is smaller than approximately 1.8". DVD 1510 may be connected to memory 1519, such as RAM, ROM, low latency nonvolatile memory such as flash memory, and/or other suitable electronic data storage.

Figure 8C:
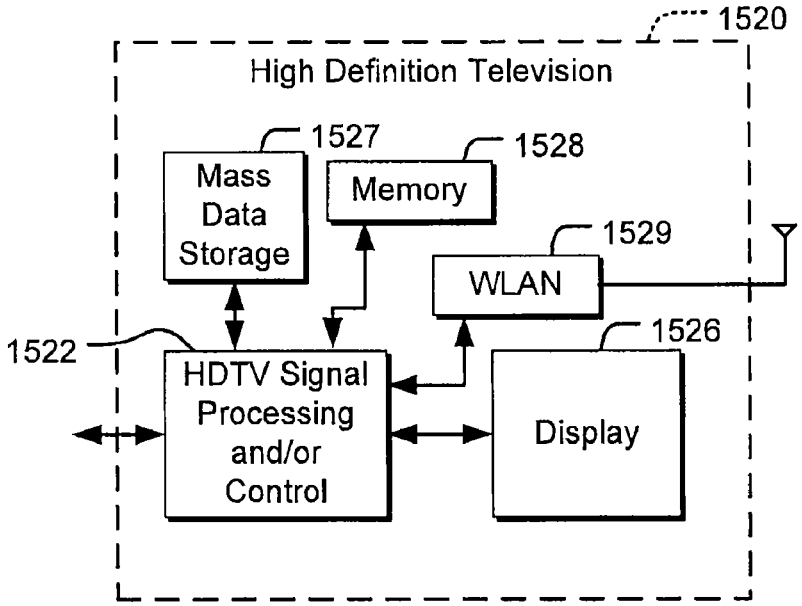
FIG. 8C is a block diagram of an embodiment of the invention in a high definition television (HDTV).

Referring now to FIG. 8C, the present invention may be embodied as a closed-loop voltage controller in a high definition television (HDTV) 1520. The embodiment of the present invention may implement either or both signal processing and/or control circuits, which are generally identified in FIG. 8C at 1522, a WLAN interface and/or mass data storage of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices. At least one HDD may have the configuration shown in FIG. 8A and/or at least one DVD may have the configuration shown in FIG. 8B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via a WLAN network interface 1529.

Figure 8D:
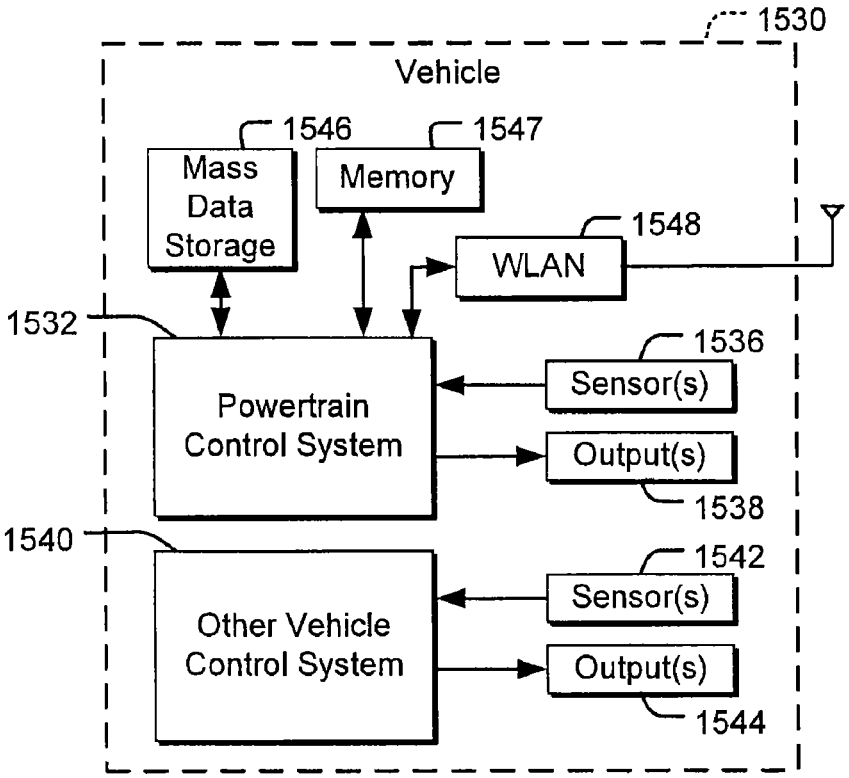
FIG. 8D is a block diagram of an embodiment of the invention in a vehicle control system.

Referring now to FIG. 8D, the present invention may be embodied as a closed-loop voltage controller in a control system of a vehicle 1530, a WLAN interface and/or mass data storage of the vehicle control system. In some implementations, the embodiment of the present invention implements a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via a WLAN network interface 1548. The control system 1540 may also include mass data storage, memory and/or a WLAN interface (all not shown).

Figure 8E:
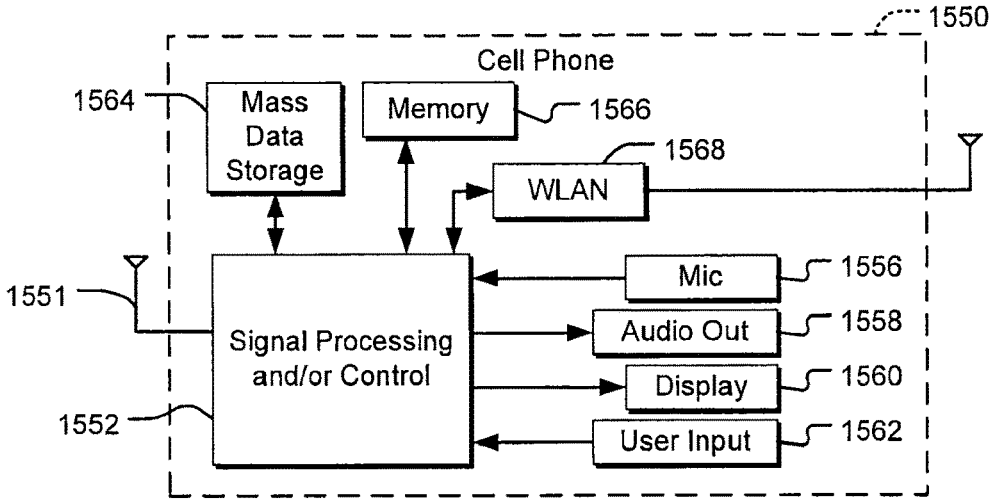
FIG. 8E is a block diagram of an embodiment of the invention in a cellular or mobile phone.

Referring now to FIG. 8E, the present invention may be embodied as a closed-loop voltage controller in a cellular phone 1550 that may include a cellular antenna 1551. The embodiment of the present invention may implement either or both signal processing and/or control circuits, which are generally identified in FIG. 8E at 1552, a WLAN interface and/or mass data storage of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via a WLAN network interface 1568.

Figure 8F:
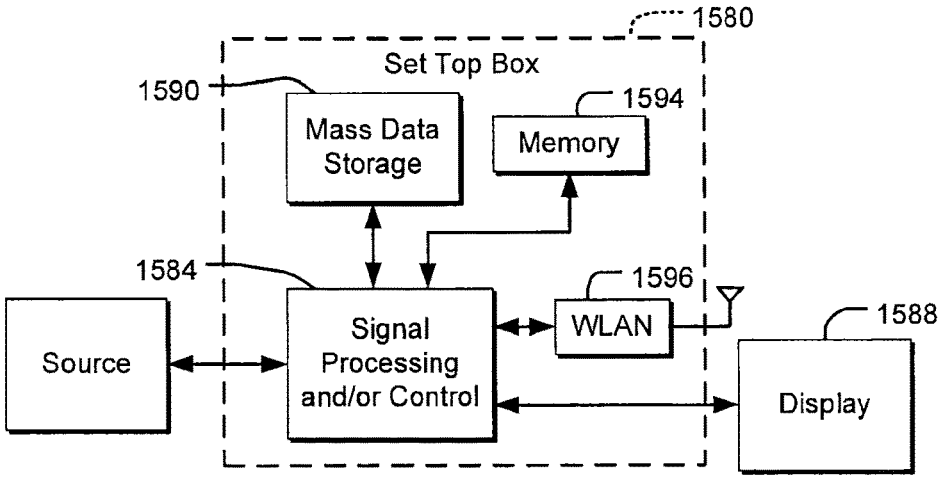
FIG. 8F is a block diagram of an embodiment of the invention in a set-top box (STB).

Referring now to FIG. 8F, the present invention may be embodied as a closed-loop voltage controller in a set top box 1580. The embodiment of the present invention may implement either or both signal processing and/or control circuits, which are generally identified in FIG. 8F at 1584, a WLAN interface and/or mass data storage of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via a WLAN network interface 1596.

Figure 8G:
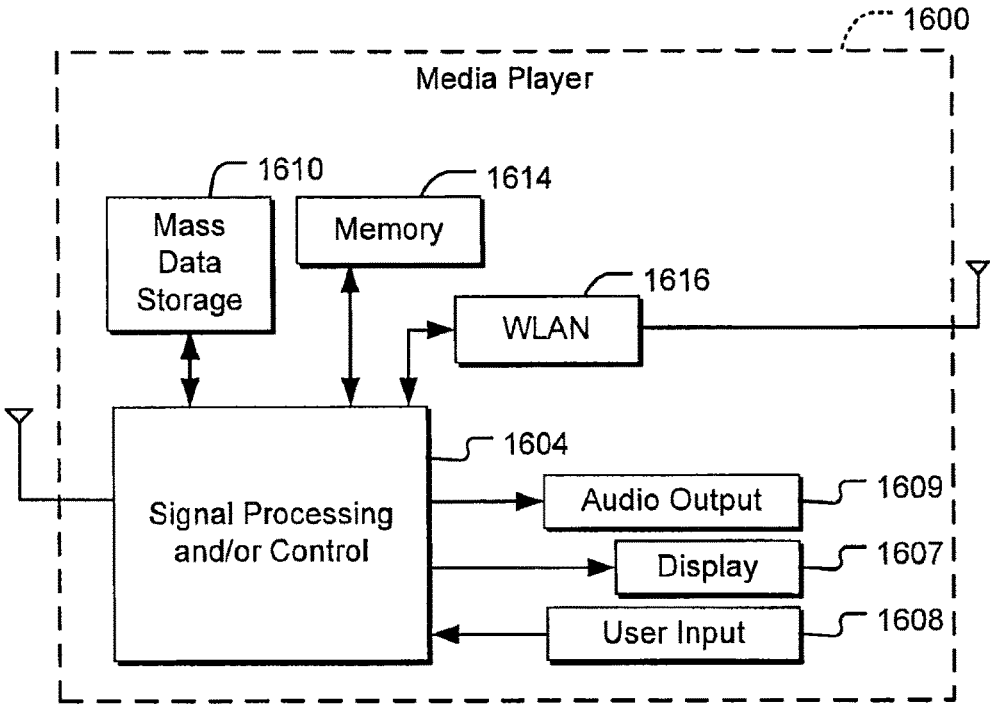
FIG. 8G is a block diagram of an embodiment of the invention in a media player.

Referring now to FIG. 8G, the present invention may be embodied as a closed-loop voltage controller in a media player 1600. The embodiment of the present invention may implement either or both signal processing and/or control circuits, which are generally identified in FIG. 8G at 1604, a WLAN interface and/or mass data storage of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via a WLAN network interface 1616. Still other implementations in addition to those described above are contemplated.

Figure 8H:
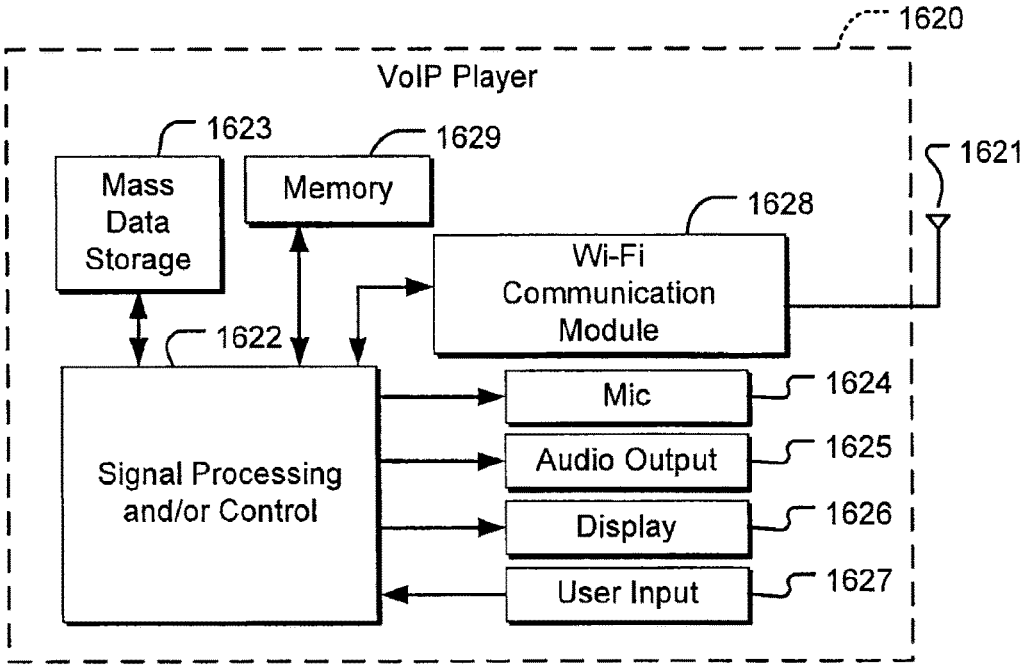
FIG. 8H is a block diagram of an embodiment of the invention in a VoIP phone.

Referring to FIG. 8H, the present invention may be embodied as closed-loop voltage controller in a Voice over Internet Protocol (VoIP) phone 1620 that may include an antenna 1621. The embodiment of the present invention may implement either or both signal processing and/or control circuits, which are generally identified in FIG. 8H at 1622, a wireless interface and/or mass data storage of the VoIP phone 1623. In some implementations, VoIP phone 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP phone 1620 may process data, perform coding and/or encryption, perform calculations, format data and/or perform other VoIP phone functions.

VoIP phone 1620 may communicate with mass data storage 1623 that stores data in a nonvolatile manner such as optical and/or magnetic storage devices, for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". VoIP phone 1620 may be connected to memory 1629, which may be a RAM, ROM, low latency nonvolatile memory such as flash memory and/or other suitable electronic data storage. VoIP phone 1620 is configured to establish communications link with a VoIP network (not shown) via Wi-Fi communication module 1628.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A closed-loop voltage controller for controlling a supply voltage of a power supply which supplies a voltage to target circuit of an integrated circuit (IC), the closed-loop voltage controller comprising:

an adjustable delay line powered by the supply voltage and co-located on the IC with the target circuit, the adjustable delay line subjected to substantially the same operating conditions as the target circuit; and a control unit to measure a delay time of the adjustable delay line, and, based on the measured delay time, to output a control signal instructing the power supply to adjust the supply voltage;

wherein the adjustable delay line comprises multiple distinct delay elements, each with delay properties and responsivity to changes in operating conditions, wherein the delay elements emulate delay properties of physical elements in the target circuit;

wherein the delay elements are connected in series and arranged in segments, each segment including delay elements having delay times, wherein a delay element of a segment and another delay element of another segment have different delay times, and wherein the number of delay elements in each delay line segment is selectable, and wherein the delay segments comprise:

a first segment of standard threshold voltage (SVT) gate delay elements;

a second segment of high threshold voltage (HVT) gate delay elements; and a third segment of wire delay elements.

2. The closed-loop voltage controller of claim 1, wherein the target circuit includes interconnected gates and each distinct delay element is constructed to emulate the delay properties of the gates and wires of the target circuit.

3. The closed-loop voltage controller of claim 1, wherein the control unit lowers the supply voltage if the measured delay time through the adjustable delay line is shorter than a lowest time in a predetermined time range, and raises the supply voltage if the measured delay time is longer than a longest time in the predetermined time range.

4. The closed-loop voltage controller of claim 1, wherein the power supply comprises an Inter-Integrated Circuit (I2C) interface slave, the power supply receives control signals via the I2C interface slave, and the power supply adjusts the supply voltage based on control signals received via the I2C interface slave.

5. The closed-loop voltage controller of claim 4, wherein the control unit outputs the control signal to an I2C interface master, and the I2C interface master forwards the control signal to the I2C interface slave of the power supply.

6. The closed-loop voltage controller of claim 4, wherein the I2C interface slave of the power supply receives control signals from other voltage controllers using the I2C protocol.

7. The closed-loop voltage controller of claim 6, wherein the I2C interface slave of the power supply receives control signals from a DVM based power manager using the I2C protocol.

8. A closed-loop voltage controller for controlling a supply voltage of a power supply which supplies a voltage to target circuit of an integrated circuit (IC), the closed-loop voltage controller comprising:

an adjustable delay line powered by the supply voltage and co-located on the IC with the target circuit, the adjustable delay line subjected to substantially the same operating conditions as the target circuit; and a control unit to measure a delay time of the adjustable delay line, and, based on the measured delay time, to output a control signal instructing the power supply to adjust the supply voltage;

wherein the adjustable delay line comprises multiple distinct delay elements, each with delay properties and responsivity to changes in operating conditions, wherein the delay elements emulate delay properties of physical elements in the target circuit;

wherein the delay elements are connected in series and arranged in segments, each segment including delay elements having delay times, wherein a delay element of a segment and another delay element of another segment have different delay times, and wherein the number of delay elements in each delay line segment is selectable;

wherein the delay segments comprise:

a first segment of standard threshold voltage (SVT) gate delay elements;

a second segment of high threshold voltage (HVT) gate delay elements; and a third segment of wire delay elements.

9. The closed-loop voltage controller of claim 8, wherein the adjustable delay line is configured to emulate a critical path of the target circuit.

10. The closed loop voltage controller of claim 9, wherein the adjustable delay line is configured such that a quantity of distinct delay elements used in the adjustable delay line is proportional to the quantity of distinct physical elements in the critical path.

11. The closed-loop voltage controller of claim 9, wherein the critical path to emulate is chosen based on a Dynamic Voltage Management (DVM) power management system.

12. The closed-loop voltage controller of claim 9, wherein the control unit measures the delay time based on a plurality of delay line measurements.

13. The closed-loop voltage controller of claim 12, wherein the plurality of delay line measurements are compared to a predetermined time.

14. The closed-loop voltage controller of claim 13, wherein the delay time is longer or shorter than the predetermined time.

15. The closed-loop voltage controller of claim 14, wherein the delay time of the adjustable delay line is adjusted for each measurement to indicate how much the delay time differs from the predetermined time, and wherein the delay time is adjusted without changing proportions of distinct delay elements used in the adjustable delay line.

16. A method for controlling a supply voltage of a power supply which supplies a voltage to a target circuit of an integrated circuit (IC), the method comprising:

providing the supply voltage to an adjustable delay line co-located on the IC with the target circuit, wherein the adjustable delay line is subjected to substantially the same operating conditions as the target circuit;

measuring a delay time of the adjustable delay line; and outputting a control signal, based on the measured delay time, instructing the power supply to adjust the supply voltage;

wherein the adjustable delay line comprises multiple distinct delay elements, each with delay properties and responsivity to changes in operating conditions, wherein the delay elements emulate delay properties of physical elements in the target circuit;

wherein the delay elements are connected in series and arranged in segments, each segment including delay elements having delay times, wherein a number of delay elements in each delay line segment is selectable;

wherein a delay element of a segment and another delay element of another segment have different delay times; and wherein the delay segments comprise:

a first segment of standard threshold voltage (SVT) gate delay elements;

a second segment of high threshold voltage (HVT) gate delay elements; and a third segment of wire delay elements.

17. The method of claim 16, wherein the target circuit includes interconnected gates and each distinct delay element is constructed to emulate the delay properties of the gates and wires of the target circuit.

18. The method of claim 16, further comprising configuring the adjustable delay line to emulate a critical path of the target circuit.

19. The method of claim 18, wherein the adjustable delay line is configured such that a quantity of distinct delay elements used in the adjustable delay line is proportional to the corresponding quantity of distinct physical elements in the critical path.

20. The method of claim 18, further comprising choosing the critical path to emulate based on a Dynamic Voltage Management (DVM) power management system.

21. The method of claim 18, wherein the delay time is measured based on a plurality of delay line measurements.

22. The method of claim 21, wherein the plurality of delay line measurements are compared to a predetermined time.

23. The method of claim 22, wherein the delay time of the adjustable delay line is adjusted for each measurement to indicate how much the delay time differs from the predetermined time, and wherein the delay time is adjusted without changing proportions of distinct delay elements used in the adjustable delay line.

24. The method of claim 16, wherein the supply voltage is lowered if the measured delay time through the adjustable delay line is shorter than a lowest time in a predetermined time range, and the supply voltage is raised if the measured delay time is longer than a longest time in the predetermined time range.

25. The method of claim 16, wherein the power supply comprises an Inter-Integrated Circuit (I2C) interface slave, the power supply receives control signals via the I2C interface slave, and the power supply adjusts the supply voltage based on control signals received via the I2C interface slave.

26. The method of claim 25, wherein the control signal is output to an I2C interface master, and the I2C interface master forwards the control signal to the I2C interface slave of the power supply.

27. The method of claim 25, wherein the I2C interface slave of the power supply receives control signals from other voltage controllers using the I2C protocol.

28. The method of claim 27, wherein the I2C interface slave of the power supply receives control signals from a DVM based power manager using the I2C protocol.

*29. An integrated circuit, comprising:*

*a first operational circuit configured to receive a first supply voltage from a first voltage regulator that is external to the integrated circuit;*

*a first performance monitoring circuit, disposed on the integrated circuit, configured to generate at least a first indicator corresponding to at least one performance characteristic of the first operational circuit and output the first indicator to a voltage control and feedback generator circuit disposed on the integrated circuit; and*

*the voltage control and feedback generator circuit configured to receive the first indicator from the first performance monitoring circuit disposed on the integrated circuit and output a first feedback voltage signal to the first voltage regulator that is external to the integrated circuit, the first feedback voltage signal having a voltage level that varies as a function of at least the first indicator, the first voltage regulator being configured to regulate the first supply voltage as a function of the first feedback voltage signal.*

*30. The integrated circuit of claim 29, wherein the voltage control and feedback generator circuit is configured to output the first feedback voltage signal as a function of both the first indicator and the first supply voltage.*

*31. A method for controlling a supply voltage, comprising:*

*generating in an integrated circuit, by a first performance monitoring circuit disposed on the integrated circuit, at least a first indicator corresponding to at least a performance characteristic of a first operational circuit operating under a first supply voltage provided by a first voltage regulator that is external to the integrated circuit;*

*outputting the first indicator to a voltage control and feedback generator circuit disposed on the integrated circuit;*

*receiving, by the voltage control and feedback generator circuit, the first indicator from the first performance monitoring circuit disposed on the integrated circuit; and*

*providing to the first voltage regulator that is external to the integrated circuit, a first feedback voltage signal as a function of at least the first indicator, the first voltage regulator regulating the first supply voltage based on the first feedback voltage signal.*

*32. The method of claim 31, wherein providing to the first voltage regulator the first feedback voltage signal as a function of at least the first indicator further comprises:*

*providing the first feedback voltage signal as a function of both the first indicator and the first supply voltage.*

*33. An electronic system, comprising:*

*a first voltage regulator configured to regulate a first supply voltage based on a first feedback voltage signal having a voltage level that varies as a function of at least a performance characteristic of an operational circuit of the electronic system; and*

*an integrated circuit that comprises:*

*a first operational circuit configured to receive the first supply voltage from the first voltage regulator that is external to the integrated circuit;*

*a first performance monitoring circuit, disposed on the integrated circuit, configured to generate at least a first indicator corresponding to at least one performance characteristic of the first operational circuit and output the first indicator to a voltage control and feedback generator circuit disposed on the integrated circuit; and*

*the voltage control and feedback generator circuit configured to receive the first indicator from the first performance monitoring circuit disposed on the integrated circuit and output the first feedback voltage signal to the first voltage regulator that is external to the integrated circuit, the first feedback voltage signal having a voltage level that varies as a function of at least the first indicator, the first voltage regulator being configured to regulate the first supply voltage as a function of the first feedback voltage signal.*

* * * * *